(12) United States Patent
Moriyama et al.

(10) Patent No.: US 12,312,844 B2
(45) Date of Patent: May 27, 2025

(54) DOOR HANDLE CONTROL DEVICE OF VEHICLE

(71) Applicant: Mazda Motor Corporation, Hiroshima (JP)

(72) Inventors: Yukihiro Moriyama, Aki-gun (JP); Eisuke Kuramoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 236 days.

(21) Appl. No.: 17/961,583

(22) Filed: Oct. 7, 2022

(65) Prior Publication Data
US 2023/0112553 A1    Apr. 13, 2023

(30) Foreign Application Priority Data

Oct. 8, 2021    (JP) .................. 2021-166064

(51) Int. Cl.
*E05B 85/10*    (2014.01)
*E05B 85/16*    (2014.01)
*B60R 25/01*    (2013.01)
*E05B 81/66*    (2014.01)

(52) U.S. Cl.
CPC ............ *E05B 85/107* (2013.01); *E05B 85/16* (2013.01); *B60R 25/01* (2013.01)

(58) Field of Classification Search
CPC ...... Y10S 292/31; E05B 85/10; E05B 85/103; E05B 85/107
See application file for complete search history.

(56) References Cited

U.S. PATENT DOCUMENTS

| | | | | |
|---|---|---|---|---|
| 6,659,515 | B2 * | 12/2003 | Raymond | E05B 81/20 |
| | | | | 292/201 |
| 9,903,143 | B2 * | 2/2018 | Hiramoto | E05B 81/68 |
| 10,954,702 | B2 * | 3/2021 | Couto Maquieira | E05B 81/16 |
| 11,512,506 | B2 * | 11/2022 | Sobecki | E05B 81/58 |
| 11,821,245 | B2 * | 11/2023 | Herdering | E05B 85/103 |
| 11,885,158 | B2 * | 1/2024 | Cumbo | E05B 81/25 |

FOREIGN PATENT DOCUMENTS

JP    2018-2027 A    1/2018

* cited by examiner

*Primary Examiner* — Carlos Lugo
(74) *Attorney, Agent, or Firm* — XSENSUS LLP

(57) ABSTRACT

A vehicle having improved opening and closing operability of a side door includes a lever that projects to an outer side in a vehicle width direction from a storage position at which the handle lever is flush with the surface of a door outer panel, a position switch that detects the movement position of the lever, a latch mechanism that has a latch engageable with a striker in conjunction with the lever, a latch switch that detects whether the latch is in a full-latch state, a driving device capable of changing the position of the lever in a range from the storage position to a gripping position, and a CPU capable of controlling the driving device, in which the CPU forcibly changes the position of the lever to the gripping position when the latch is in a half-latch state and the lever is at the storage position.

4 Claims, 9 Drawing Sheets

40: DRIVING DEVICE
60a: REQUEST SWITCH
70a: POSITION SWITCH

40: DRIVING DEVICE
60a: REQUEST SWITCH
70a: POSITION SWITCH

DOOR HANDLE CONTROL DEVICE OF VEHICLE

BACKGROUND

Cross-Reference to Related Application

The present application claims priority to Japanese Patent Application 2021-166064, filed Oct. 8, 2021, the entire contents of which are incorporated herein by reference.

Technical Field

The present disclosure relates to a door handle control device of a vehicle and, more particularly, to a door handle control device of a vehicle having a handle lever capable of projecting to the outer side in a vehicle width direction from a storage position at which the handle lever is flush with the surface of a door panel, and a position change unit capable of changing the movement position of the handle lever from the storage position.

Description of the Related Art

There is conventionally proposed a technology that makes the outer surface of a door panel flush (flush surface) with the outer surface of a handle lever to improve the design of a vehicle side door and reduce the air resistance during travel. The position of the handle lever of the flush surface door is changed between a design-oriented storage position located in a recess formed toward the inner side of a door panel so that the handle lever is flush with the outer surface of a door outer panel and an operability-oriented gripping position at which the handle lever projects to the outer side in the vehicle width direction from the storage position so that the occupant can manually perform an open operation.

A vehicle latch mechanism normally has a striker installed in the rear portion of the door opening of the vehicle body and a latch engageable with this striker. The engagement of the latch of this latch mechanism is classified into three states: an unlatch state in which the engagement between the striker and the latch is fully released, a half-latch state in which the striker slightly engages the latch, and a full-latch state in which the striker fully engages the latch.

When the occupant gets out of the vehicle, depending on the force applied by the occupant to close the side door, the latch mechanism may be put in the half-latch state (so-called half-shut state of the side door) in which the latch mechanism half engages the striker.

In the half-shut state, the vehicle faces the high risk of crime or the risk of occurrence of breakage due to contact between the opened side door and parking facilities when the vehicle moves in a multilevel car parking.

The notification device in patent document 1 includes a vehicle interior light that emits light capable of partially passing through the window of the side door, a sensing unit that senses the open state, the closed state, and the half-shut state of the side door, and a control unit that controls the vehicle interior light based on the sensing result of the sensing unit, in which the control unit changes the illumination style of the vehicle interior light according to the open state, the closed state, and the half-shut state having been detected.

Patent Documents

[Patent document 1] JP-A-2018-002027

SUMMARY

The notification device in patent document 1 can notify the occupant of the open-close state (latch engagement state) of the side door based on the emitted light having passed through the window when the occupant closes the side door and leaves the vehicle, and the occupant can visually recognize the open-close state of the side door via the emitted light when getting out of the vehicle. However, since the illumination style of the vehicle interior light needs to be changed in the notification device in patent document 1, an illumination mechanism dedicated to half-shut notification needs to be prepared, the structure of the entire device becomes complicated and the production cost may become high.

The flush surface door has an auto-closure mechanism that automatically returns the handle lever from the gripping position to the storage position after opening and closing the door in order to prevent mischief.

When this auto-closure mechanism is adopted, the latch mechanism may be in the half-latch state (half-shut state) even though the handle lever is at the storage position.

To change the state of the latch mechanism from the half-latch state to the full-latch state in which the striker fully engages the latch, the occupant needs to change the position of the handle lever from the storage position to the gripping position by pressing the request switch provided in the side door again and then manually open and close the door again, so the procedure for correctly closing the door may become complicated.

That is, it is not easy to improve the opening and closing operability of the side door while suppressing the production cost.

An object of the present disclosure is to provide a door handle control device of a vehicle that can improve the opening and closing operability of the side door while suppressing the production cost.

A door handle control device of a vehicle according to a first aspect includes: a handle lever capable of projecting to an outer side in a vehicle width direction from a storage position at which the handle lever is flush with a surface of a door panel; a handle lever position detection unit that detects a movement position of the handle lever; a latch mechanism that has a latch engageable with a striker provided in a vehicle body in conjunction with the handle lever; a latch state detection unit that detects whether the latch is in a full-latch state; a position change unit capable of changing a position of the handle lever in a range from the storage position to a position at which engagement between the striker and the latch is releasable; and a control unit capable of controlling the position change unit, in which the control unit changes the position of the handle lever to a gripping position at which an occupant is able to grip the handle lever by causing the handle lever to project from a surface of the door panel via the position change unit when the latch is not in the full-latch state and the handle lever is at the storage position.

Since this door handle control device of a vehicle has the handle lever capable of projecting to the outer side in the vehicle width direction from the storage position at which the handle lever is flush with the surface of the door panel, the design of the side door can be improved. Since the control unit changes the position of the handle lever to the gripping position at which the occupant is able to grip the handle lever by causing the handle lever to project from the surface of the door panel via the position change unit when the latch is not in the full-latch state and the handle lever is at the storage position, the occupant having gotten out of the vehicle can visually recognize the half-latch state of the latch mechanism without need for a new dedicated notification mechanism.

A second aspect of the present disclosure is the first aspect of the present disclosure further including: a request switch operated by the occupant to open the closed door panel, the request switch being provided on the door panel, in which the control unit changes the position of the handle lever to the gripping position via the position change unit based on an operation of the request switch when the latch is in the full-latch state and the handle lever is at the storage position.

This structure can achieve both the design (flush surface) and the opening and closing operability of the side door and the existing mechanism can be used.

A third aspect of the present disclosure is the first or second aspect of the present disclosure in which the control unit changes the position of the handle lever to the storage position via the position change unit a predetermined time after the position of the handle lever is changed to the gripping position via the position change unit.

Since this structure can limit the operation of the handle lever under a predetermined condition, anti-crime measures can be taken.

A fourth aspect of the present disclosure is any one of the first to third aspects of the present disclosure in which the control unit stops the movement of the handle lever via the position change unit when the handle lever position detection unit detects the handle lever at the gripping position.

Since this structure can avoid damage to the position change unit by suppressing excess loads on the position change unit.

In the door handle control device of a vehicle according to the present disclosure, when the latch is not in the full-latch state in which engagement with the striker is sufficient, it is possible to improve the operability of the side door while suppressing the production cost by forcibly moving the handle lever to the gripping position.

BRIEF DESCRIPTION OF THE DRAWINGS

The scope of the present disclosure is best understood from the following detailed description of exemplary embodiments when read in conjunction with the accompanying drawings.

DETAILED DESCRIPTION

Non-limiting embodiments of the present disclosure will be described below with reference to the drawings. The following description of the embodiments is merely exemplary in essence and not intended to limit the present disclosure, its application, nor its usage.

First Example

A first example of the present disclosure will be described below with reference to FIGS. 1 to 9.

Figure 1:
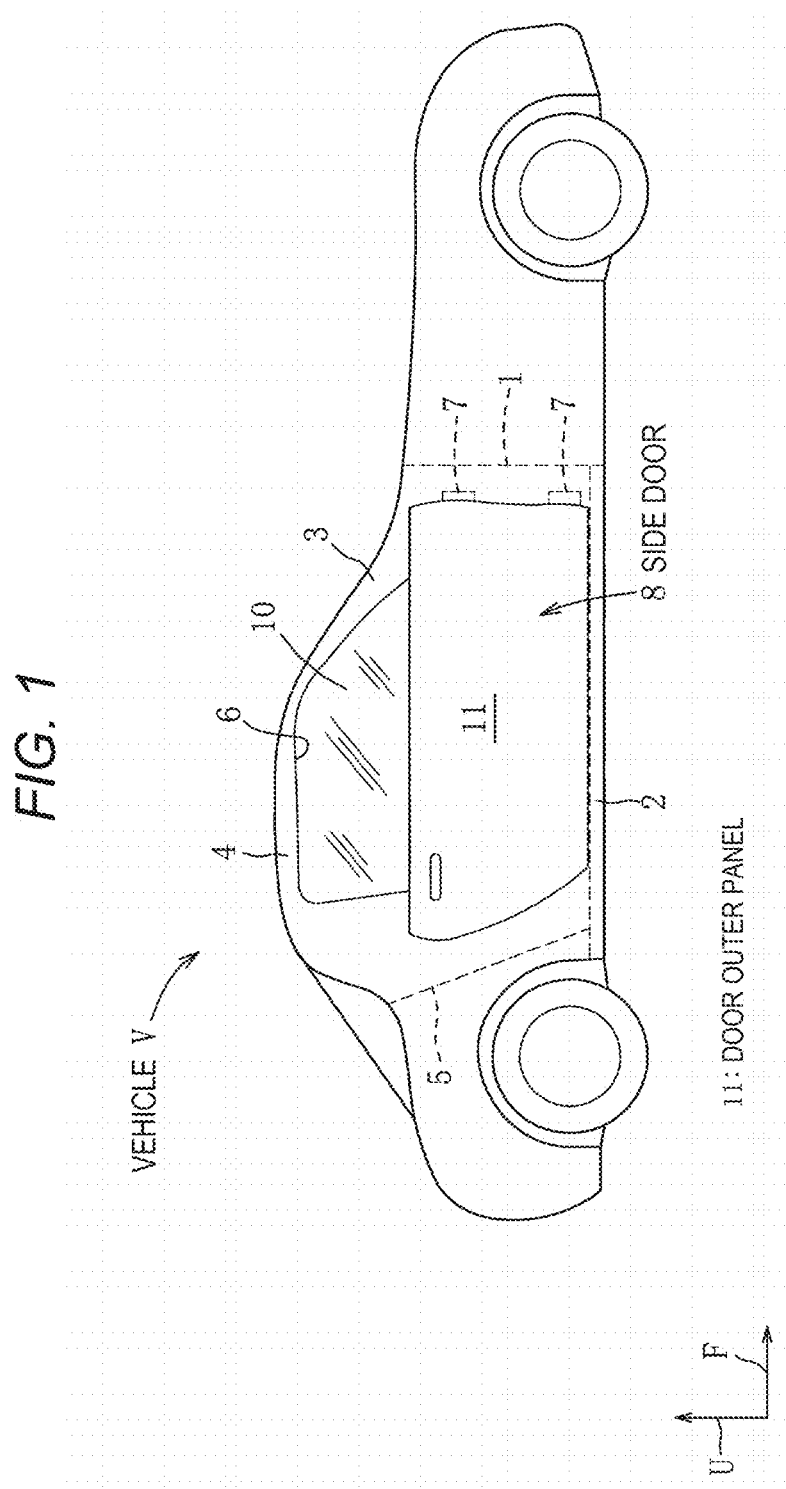
FIG. 1 is a side view of a vehicle having a door handle control device of a vehicle according to a first example.

As illustrated in FIG. 1, a vehicle V includes hinge pillars 1 that extend in a vertical direction of a vehicle body in front of a vehicle interior, side sills 2 that extend in the front-rear direction of the vehicle body in a lower portion of the vehicle body, front pillars 3 that extend diagonally upward from the upper ends of the hinge pillars 1 toward the rear, roof side rails 4 that extend toward the rear of the vehicle body continuously from the rear ends of the front pillars 3, and rear pillars 5 that couple these roof side rails 4 and the side sills 2 to each other substantially in the vertical direction of the vehicle body.

It should be noted that, in the drawings, arrow F indicates the front, arrow OUT indicates the outer side in the vehicle width direction, and arrow U indicates the upper side.

The portion enclosed by the hinge pillar 1, the side sill 2, the front pillar 3, the roof side rail 4, and the rear pillar 5 forms a door opening 6.

A side door 8 mounted to the hinge pillar 1 in an openable and closable manner via a pair of upper and lower door hinges 7 and 7 opens and closes the door opening 6.

Figure 2:
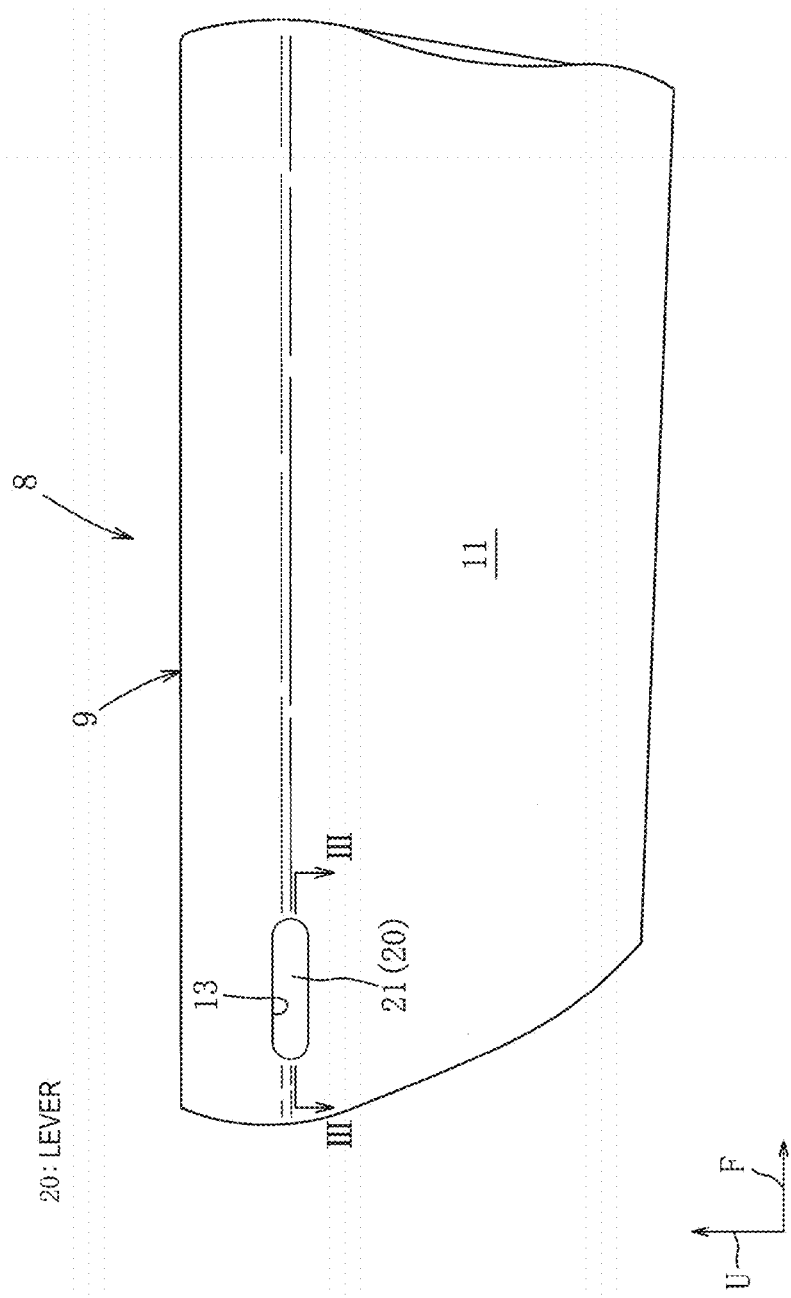
FIG. 2 is a side view of a side door having a lever at a storage position.

As illustrated in FIGS. 1 and 2, the side door 8 has a door body 9 and a door window glass 10 as a door window member. In addition, the door body 9 includes a door outer panel 11, a door inner panel, and a reinforcement 12 (see FIG. 3) provided on the inner side in the vehicle width direction and on the rear side of the door outer panel 11.

Figure 3:
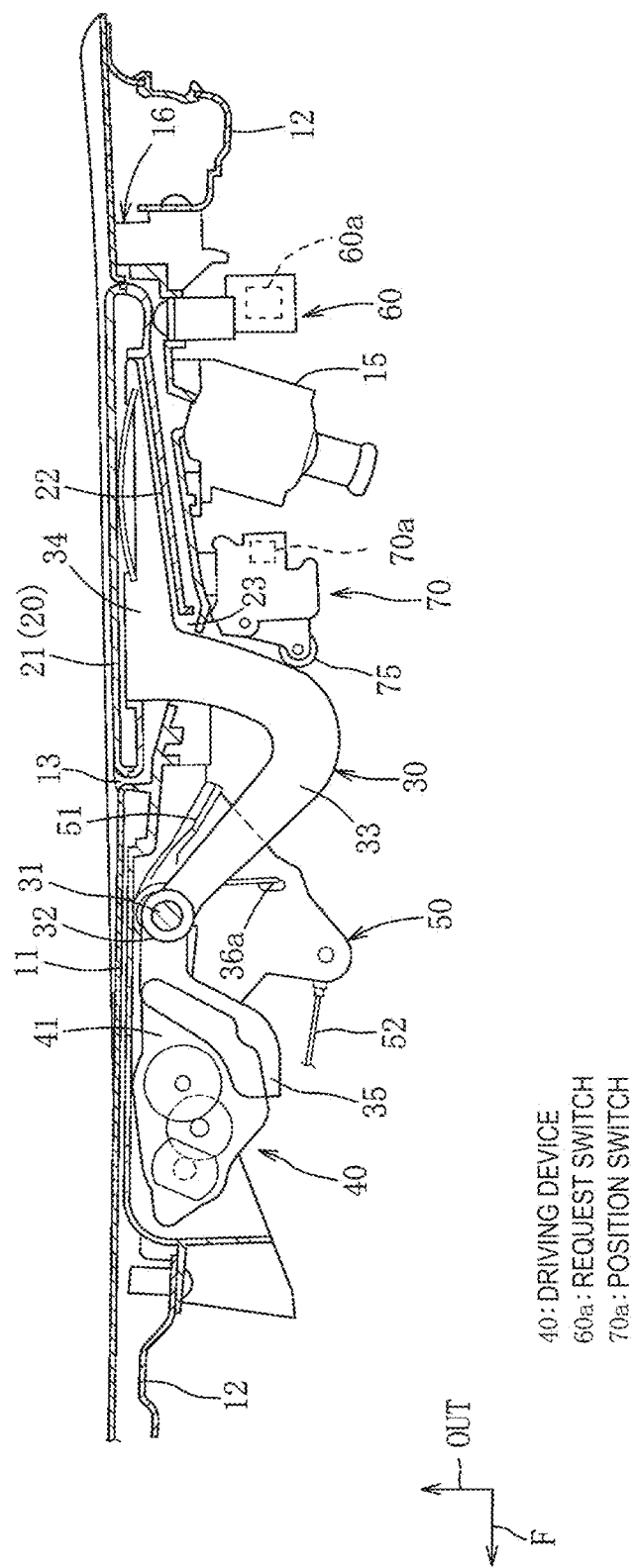
FIG. 3 is a sectional view taken along line III-III in FIG. 2.

As illustrated in FIG. 3, a door handle structure that opens and closes the side door 8 includes a door handle lever 20 (abbreviated below as a lever) capable of projecting in the vehicle width direction from the opening 13 of the door outer panel 11 as the outer door panel, a hinge arm 30 with a curved swan-neck structure having this lever 20, and a driving device 40 that transmits power to the hinge arm 30 so that the lever 20 projects from the door outer panel 11.

The door handle structure further includes a metal bracket 16, fixed to the reinforcement 12 provided in the door panel, that houses the lever 20.

The lever 20 includes an outer cover 21 and an inner cover 22 illustrated in FIG. 3, and the peripheral portions of the outer cover 21 and the inner cover 22 are concave-convex-fitted and joined to each other.

In addition, this lever 20 and the opening 13 of the door outer panel 11 are formed in an oblong shape that is long in the front-back direction in side view.

As illustrated in FIG. 3, an opening 23 into which the hinge arm 30 is inserted during assembly is formed in front of the inner cover 22.

The hinge arm 30 has the lever 20 at one end (rear end) and a hinge pin 31 as a pivoting shaft at the other end (front end) about which the lever 20 pivots so as to project to the outer side in the vehicle width direction from the door outer panel 11. This hinge pin 31 is fixed to the bracket 16 and extends in the vertical direction.

As illustrated in FIG. 3, the hinge arm 30 integrally includes a pivotable support portion 32 that pivotably supports the hinge pin 31, a lever support portion 34 that extends from this pivotable support portion 32 to the rear via a swan-neck shaped neck portion 33, and an extension portion 35 that extends from the pivotable support portion 32 to the front on the opposite side of the neck portion 33. The lever support portion 34 is disposed in the lever 20 that includes the outer cover 21 and the inner cover 22.

Figure 4:
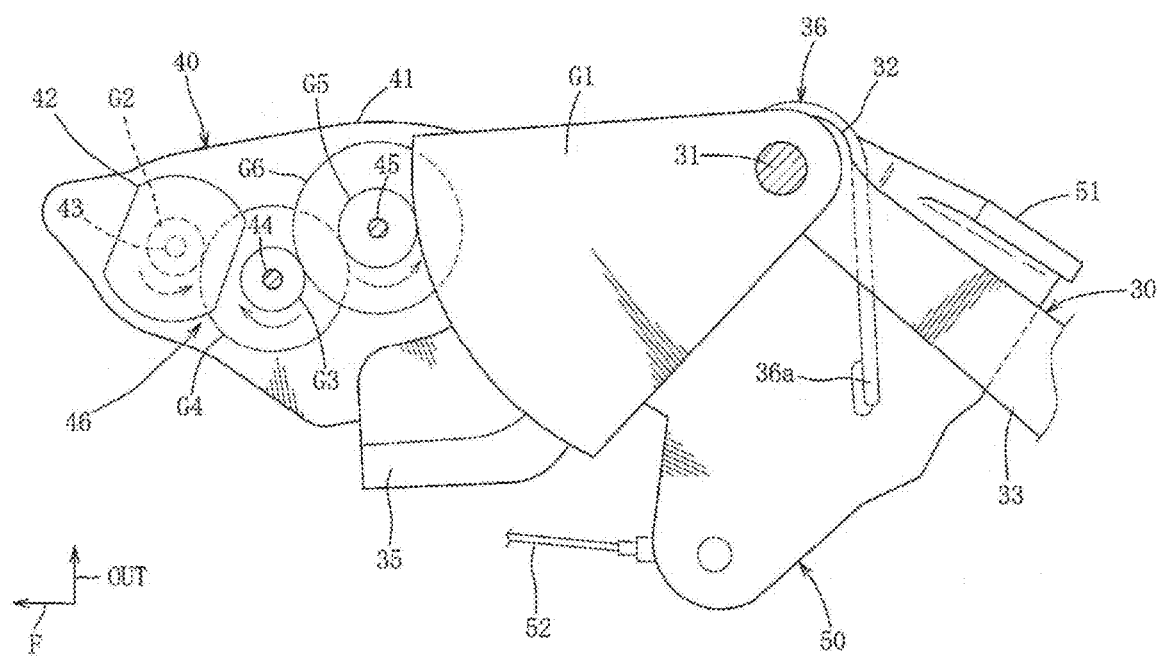
FIG. 4 is a plan view of a driving device.

As illustrated in FIGS. 3 and 4, a motor base 41 on which the driving device 40 is assembled is mounted to the extension portion 35 of the hinge arm 30.

In addition, a crank plate 50 is provided concentrically with the hinge pin 31. A vertical wall 51, which comes into contact with the neck portion 33 of the hinge arm 30 and is locked when the lever 20 and the hinge arm 30 pivot to the vicinity of the gripping position (see FIG. 6), is integrally formed on the outer side in the vehicle width direction and on the rear side of this crank plate 50.

Figure 5:
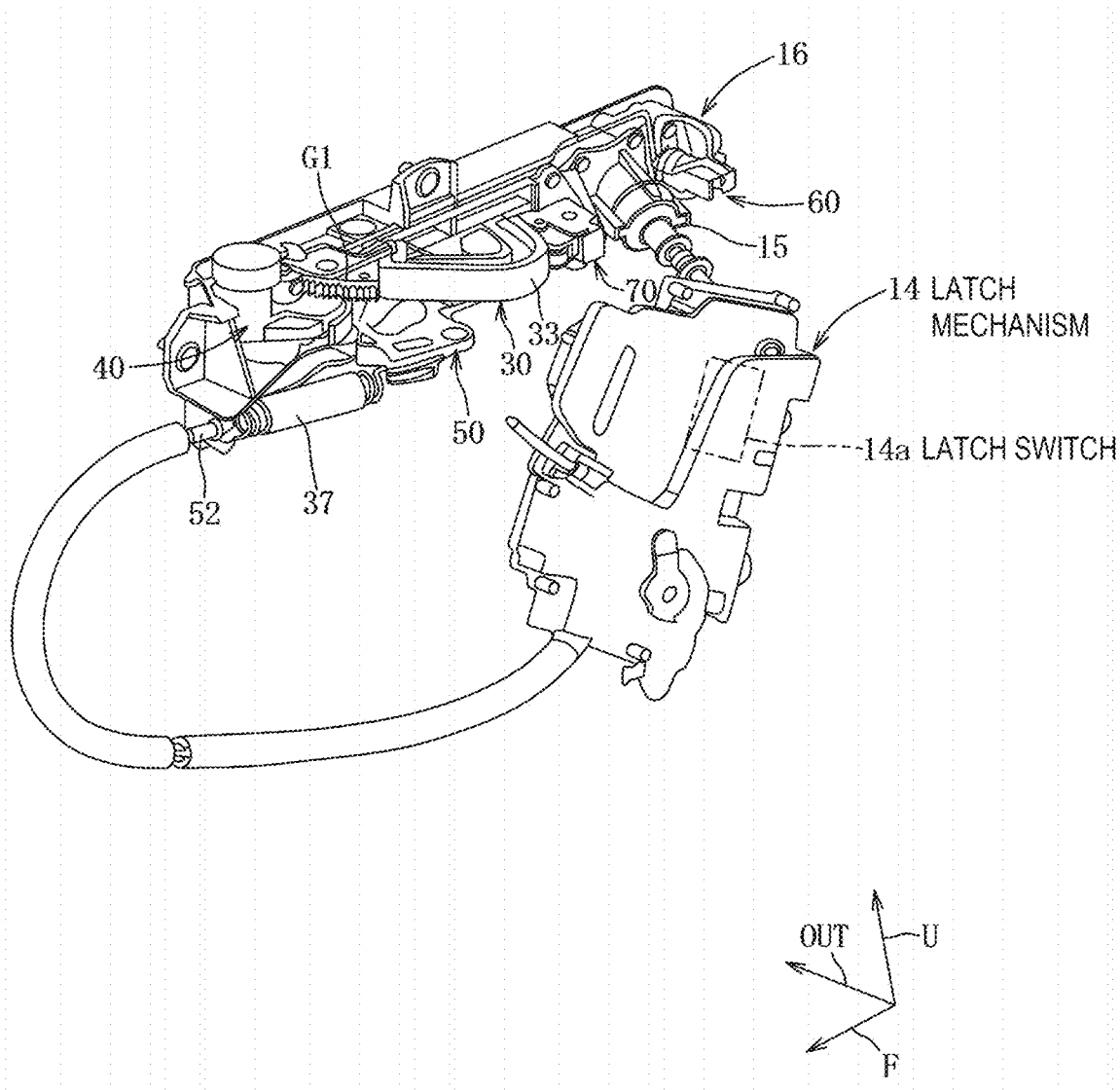
FIG. 5 is a perspective view illustrating the relationship between a door handle structure and a latch mechanism.

As illustrated in FIGS. 3 and 5, a release wire 52 that can release a latch pivotably provided in a latch mechanism 14 from a striker installed in the vehicle body is fixed to an inner end portion in the vehicle width direction of the crank plate 50.

The crank plate 50 is constantly spring-biased in the anti-release direction by a coil spring 37 having a larger spring force.

The latch mechanism 14 is disposed inside the rear portion of the door body 9.

This latch mechanism 14 has a latch switch 14a (latch status detection unit) that can detect whether the latch is in a full-latch state. The latch switch 14a can determine the engagement state of the latch with respect to the striker based on the pivotal position of the latch. Specifically, the latch switch 14a detects the full-latch state, a half-latch state, and the unlatch state.

In contrast, a torsion spring 36 as a biasing unit is wound around the hinge pin 31, as illustrated in FIG. 4. One end 36a of this torsion spring 36 is locked to the crank plate 50 and the other end of the torsion spring 36 is locked to the extension portion 35 of the hinge arm 30. This causes the torsion spring 36 to constantly spring-bias the lever 20 in the retracting direction. This spring force of the torsion spring 36 is set to be smaller than the spring force of the coil spring 37 (see FIG. 5), which biases the crank plate 50 in the anti-release direction.

Next, the structure of the driving device 40 that transmits power to the other end of the hinge arm 30 will be described with reference to FIG. 4. The driving device 40 has a sector gear G1 (fan-shaped gear) fixed coaxially with the hinge pin 31. This sector gear G1 is fitted onto the hinge pin 31, is mounted to the bracket 16, and is formed so that its position does not change. That is, this sector gear G1 does not pivot.

A motor 42 (position change unit) that is a reversible motor is mounted on the motor base 41. An output gear G2 is fitted to the rotating shaft 43 of this motor 42. A shaft 44 provided on the motor base 41 is provided with an idle gear G4 having a pinion gear G3. In addition, another shaft 45 provided on the motor base 41 is provided with a driven gear G6 having a pinion gear G5.

As illustrated in FIG. 4, the output gear G2 engages the idle gear G4. The pinion gear G3 engages the driven gear G6. The pinion gear G5 engages the sector gear G1. Accordingly, when the motor 42 is driven (driven forward) in the projection direction of the lever 20 and the rotation shaft 43 and the output gear G2 are rotated counterclockwise in FIG. 4, the pinion gear G5 rotates counterclockwise in FIG. 7 through the gears G2, G4, G3, and G6 in this order.

When the pinion gear G5 rotates counterclockwise in FIG. 4, the gear train 46 including the elements G2 to G6, the motor 42, and the motor base 41 move the lever 20 in the projection direction along the fan shape of the sector gear G1 because the position of the sector gear G1 does not change, and causes the lever 20 to project via the hinge arm 30.

The lever 20 can pivot between the storage position (see FIG. 3) at which the outer cover 21 thereof is flush with the door outer panel 11, the gripping position (pop-up position) at which the entire design surface that is flush with the lever 20 at the storage position of the lever 20 projects (pops up) from the door outer panel 11 by the driving device 40 so that the occupant can grip the lever 20, and an open position (see FIG. 7) at which the surface projects to the outer side in the vehicle width direction of this grip position.

In the embodiment, the gripping position corresponds to the position at which the engagement between the striker and the latch can be released.

The driving device 40 can pivot the lever 20 from the storage position to the gripping position. In addition, while the hinge arm 30 reaches the gripping position illustrated in FIG. 6 after leaving the storage position illustrated in FIG. 3, the crank plate 50 is biased in the anti-release direction by the strong coil spring 37 having a strong spring force without pivoting about the hinge pin 31.

Figure 6:
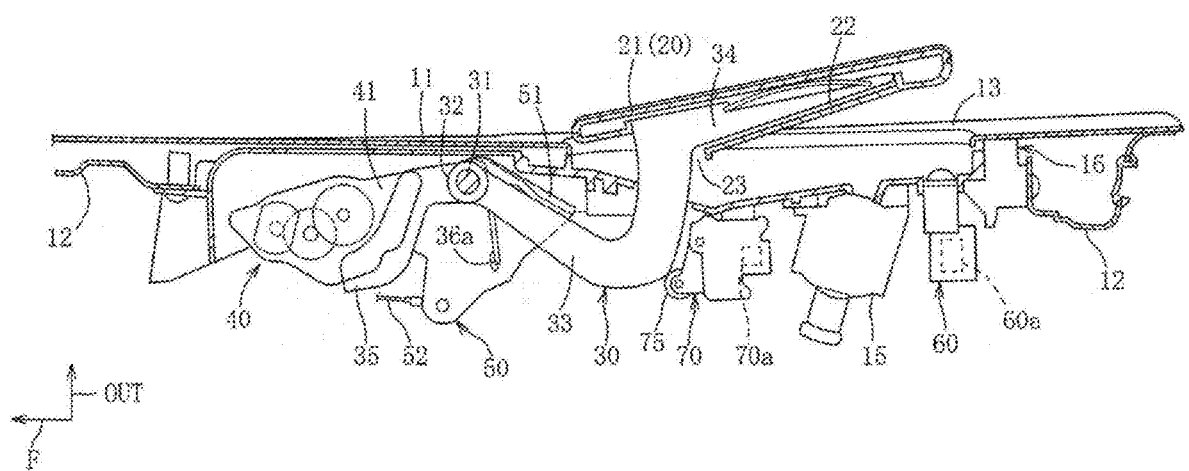
FIG. 6 is a diagram equivalent to FIG. 3 illustrating the side door having the lever at a gripping position.
Figure 7:
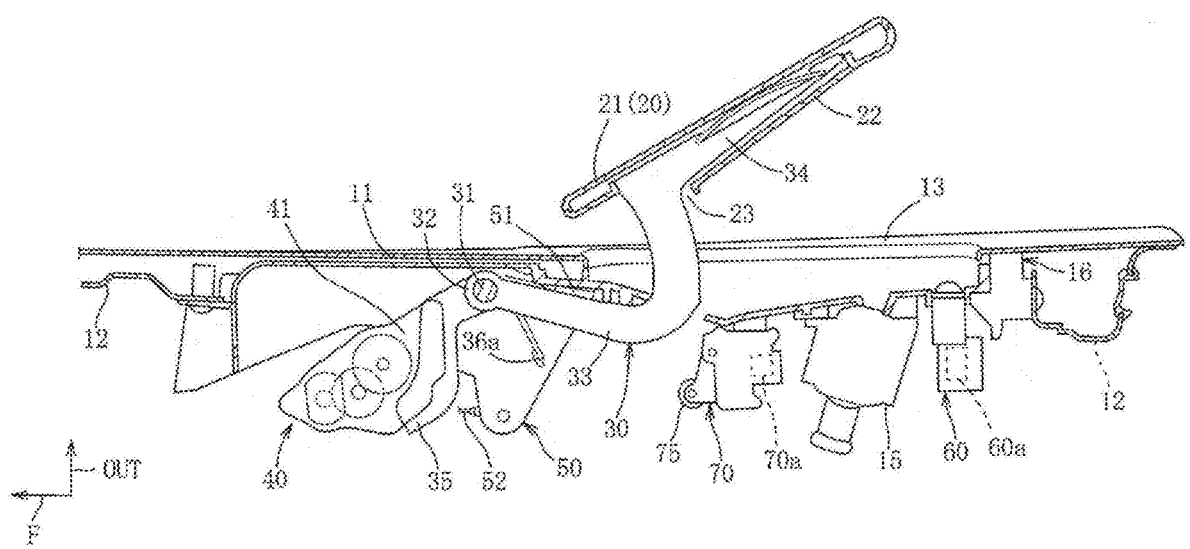
FIG. 7 is a diagram equivalent to FIG. 3 illustrating the side door having the lever at an open position.

Since the lever 20 projects from the door outer panel 11 to the outer side in the vehicle width direction by a predetermined amount in the gripping position illustrated in FIG. 6, the occupant can grasp the lever 20 with fingertips.

Furthermore, the movement from the gripping position to the open position (see FIG. 7) is performed by causing the occupant to manually open the lever 20.

As illustrated in FIG. 6, when the hinge arm 30 reaches the gripping position, the neck portion 33 of the hinge arm 30 approaches the vertical wall 51 of the crank plate 50.

Furthermore, when the lever 20 is pivoted in the open direction against the spring force of the coil spring 37, the neck portion 33 and the vertical wall 51 come into contact with each other, and the crank plate 50 pivots in the release direction. Eventually, the engagement of the latch with the striker is released via the release wire 52. It should be noted that the neck portion 33 may come into contact with the vertical wall 51 at a timing of the gripping position or at a timing after the gripping position.

As illustrated in FIG. 3, a switch unit 60 is disposed in the rear end portion of the lever 20, specifically in the inner side portion in the vehicle width direction on the rear end side of the bracket 16 facing the rear end portion of the inner cover 22. This switch unit 60 has a request switch 60a therein.

When the rear end portion of the lever 20 is pressed, the request switch 60a is turned on via the lever 20 and current is fed to the motor 42.

In addition, a key cylinder 15 is disposed in a portion of the bracket 16 in front of the switch unit 60. Furthermore, as illustrated in FIG. 3, at the storage position of the lever 20, a temporary holding mechanism 70, which temporarily holds the hinge arm 30 at the gripping position, is disposed at a predetermined position of the bracket 16 between the neck portion 33 of the hinge arm 30 and the key cylinder 15.

The temporary holding mechanism 70 mechanically holds the hinge arm 30 against the biasing force of the torsion spring 36 as the biasing unit. This temporary holding mechanism 70 holds the hinge arm 30 at a position at which the lever 20 is located at the gripping position and allows the occupant to manually move the lever 20 in the storage direction or the open direction.

The lever 20 is provided swingably with respect to the lever support portion 34 of the hinge arm 30. Accordingly, when the rear end portion of the lever 20 at the storage position is pressed from the outer side in the vehicle width direction, the rear end portion of the lever 20 swings and displaces to the inner side in the vehicle width direction and reaches the switch pressing position at which the request switch 60a in the switch unit 60 is turned on.

The temporary holding mechanism 70 temporarily holds the stop position of the hinge arm 30 at the gripping position of the lever 20. This temporary holding mechanism 70 includes a roller 75 as the hinge arm locking portion that locks the hinge arm 30 at the gripping position using a pressing force, and a position switch 70a (handle lever position detection unit) that can detect, at the gripping position, that the lever 20 is located at the gripping position. By providing the temporary holding mechanism 70 as described above, the hinge arm 30 can be temporarily held mechanically at the gripping position illustrated in FIG. 6 without continuing to drive the motor 42 electrically.

Next, the structure of the door handle control device of a vehicle will be described with reference to FIG. 8.

Figure 8:
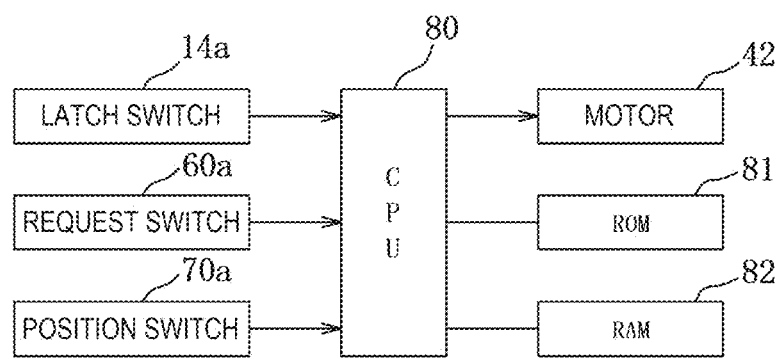
FIG. 8 is a control block diagram of a door handle control device.

FIG. 8 is a control block diagram of the door handle control device of a vehicle.

There is provided a CPU 80 as the control unit connected to the position switch 70a and the motor 42 of the driving device 40. The latch switch 14a, the request switch 60a, and the position switch 70a are connected to the input side of the CPU 80 and the motor 42 is connected to the output side of the CPU 80.

The CPU 80 controls the driving of the motor 42 according to the program stored in a ROM 81 based on input signals from the latch switch 14a, the request switch 60a, and the position switch 70a. In addition, a RAM 82 stores necessary data in a readable manner.

It should be noted that the CPU 80 has a timer unit that measures the elapsed time from the time after the position change when the lever 20 is moved to the gripping position.

The CPU 80 moves the lever 20 to the gripping position via the driving device 40 (motor 42) based on a pressing operation of the request switch 60a when the latch is in the full-latch state and the lever 20 is at the storage position. In addition, the CPU 80 stops the position change of the lever 20 by the driving device 40 when the position switch 70a detects the lever 20 at the gripping position after the lever 20 starts moving in the open direction.

The CPU 80 changes the position of the lever 20 from the gripping position to the storage position a predetermined time (for example, 5 minutes) after the position of the lever 20 is changed to the gripping position via the driving device 40 (motor 42). In addition, when the latch is not in the full-latch state and the lever 20 is at the storage position, this CPU 80 causes the lever 20 to project from the surface of the outer panel 11 via the driving device 40 (motor 42) and moves the lever 20 to the gripping position at which the occupant can grip the lever 20 with fingertips.

Additionally, the functionality of the elements disclosed herein may be implemented using circuitry or processing circuitry which includes general purpose processors, special purpose processors, central processing units (CPU), integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Next, the door handle control process will be described based on the flowchart in FIG. 9.

It should be noted that Si (i=1, 2 . . . ) indicates the steps of the processing.

Figure 9:
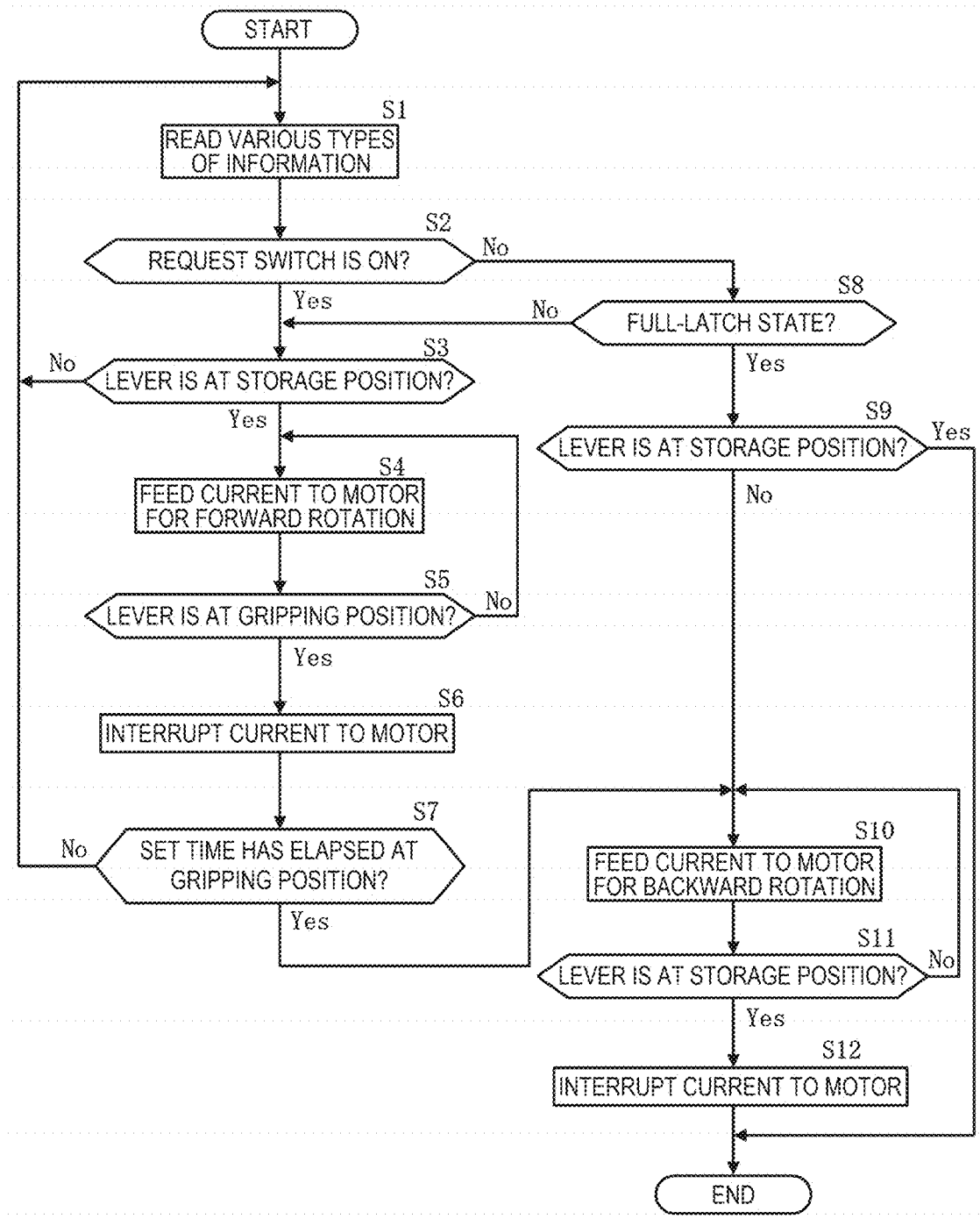
FIG. 9 is a flowchart illustrating a door handle control procedure.

First, as illustrated in FIG. 9, the CPU 80 reads various types of information such as detection signals from the switches 14a, 60a, 70a, and the like and measured values from the timer unit (S1) and the processing proceeds to S2.

In S2, it is determined whether the request switch 60a has been turned on by a pressing operation.

When the request switch 60a has been turned on as a result of the determination in S2, the processing proceeds to S3 because the occupant has requested to open the side door 8.

In S3, it is determined whether the lever 20 is at the storage position.

When the lever 20 is at the storage position as a result of the determination in S3, current is fed to the motor 42 (S4) for forward rotation to change the position of the lever 20 to the gripping position and the processing proceeds to S5.

When the lever 20 is not at the storage position as a result of the determination in S3, the processing returns to S1 because the lever 20 projects to the outer side in the vehicle width direction of at least the door outer panel 11.

In S5, it is determined whether the lever 20 is at the gripping position.

When the lever 20 having been pivoted in the forward rotation direction is at the gripping position as a result of the determination in S5, since the occupant can operate the lever 20 with fingertips, current to the motor 42 is interrupted (S6) and the processing proceeds to S7. When the lever 20 having been pivoted in the forward rotation direction is not at the gripping position as a result of the determination in S5, since the occupant cannot grip the lever 20, the processing returns to S4 so that the lever 20 further projects to the outer side in the vehicle width direction.

In S7, it is determined whether a set time (for example, five minutes) has elapsed after the position of the lever 20 is changed to the gripping position.

When the set time has elapsed after the position of the lever 20 is changed to the gripping position as a result of the determination in S7, since the lever 20 needs to be returned to the storage position to prevent mischief, current is fed to the motor 42 for backward rotation (S10) and the processing proceeds to S11. When the set time has not elapsed after the position of the lever 20 is changed to the gripping position as a result of the determination in S7, since the occupant may be still operating the lever 20, the processing returns to S1.

In S11, it is determined whether the lever 20 is at the storage position.

When the lever 20 having been pivoted in the backward rotation direction is at the storage position as a result of the determination in S11, current to the motor 42 is interrupted (S12) to stop the movement of the lever 20 and the control processing is completed. When the lever 20 having been pivoted in the backward rotation direction is not at the storage position as a result of the determination in S11, the processing returns to S10 to continue the movement of the lever 20.

When the request switch 60a has not been turned on as a result of the determination in S2, since an open request of the side door 8 by the occupant is not present, the processing proceeds to S8.

In S8, it is determined whether the latch has fully engaged the striker (so-called the full-latch state). When the latch is in the full-latch state as a result of the determination in S8, since it is expected that the occupant has closed the side door 8, the processing proceed to S9.

In S9, it is determined whether the lever 20 is at the storage position.

When the lever 20 is at the storage position as a result of the determination in S9, since the movement of the lever 20 is no longer necessary, the control processing is completed. When the lever 20 is not at the storage position as a result of the determination in S9, since the lever 20 projects to the outer side in the vehicle width direction of the surface of the door outer panel 11, the processing proceed to S10 and the position of the lever 20 is changed to the storage position.

When the latch is not in the full-latch state, that is, is in a half-shut state as a result of the determination in S8, the processing proceed to S3 and the position of the lever 20 is determined. In the case of the vehicle V having an automatic enclosure mechanism that automatically returns the lever 20 to the storage position from the gripping position as in the embodiment, even when the lever 20 is at the storage position, the latch mechanism may be in the half-latch state.

Accordingly, when the lever 20 is at the storage position and the latch mechanism is in the half-latch state, current is fed to the motor 42 for forward rotation (S4) and the position of the lever 20 is forcibly changed to the gripping position. This causes the occupant having gotten out of the vehicle to visually recognize the half-latch state of the side door 8.

That is, when the side door 8 having been normally closed is opened, the determination of the request switch 60a (S2), the determination of the storage position (S3), and the feeding of current to the motor 42 for forward rotation (S4) are performed in this order.

In contrast, when the notification of the side door 8 in the half-shut state is performed, if the request switch 60a has not been turned on, the determination of the full-latch state (S8), the determination of the storage position (S3), and the feeding of current to the motor 42 for forward rotation (S4) are performed in this order. Accordingly, the occupant can visually recognize the half-latch state without need for a dedicated notification mechanism.

Next, the operation and the effect of the door handle control device of the vehicle V will be described.

Since this door handle control device has the lever 20 capable of projecting to the outer side in the vehicle width direction from the storage position at which the door handle is flush with the surface of the door outer panel 11, the design of the side door 8 can be improved. When the latch is in the half-latch state and the lever 20 is at the storage position, since the CPU 80 changes the position of the lever 20 to the gripping position at which the occupant can grip the lever 20 by causing the lever 20 to project from the surface of the door outer panel 11 via the driving device 40, the occupant having gotten out of the vehicle can visually recognize the half-latch state without need for a new dedicated notification mechanism.

A request switch 60a, provided on the door outer panel 11, that is operated by the occupant to open the closed door outer panel 11 is present and the CPU 80 changes the position of the lever 20 to the gripping position via the driving device 40 based on the operation of the request switch 60a when the latch is in the full-latch state and the lever 20 is at the storage position. This can achieve both the design of the side door 8, particularly, the flash surface and the opening and closing operability of the side door 8 and the existing mechanism can be used.

Since the CPU 80 changes the position of the lever 20 to the storage position a predetermined time after changing the position of the lever 20 to the gripping position via the driving device 40, the operation of the lever 20 under predetermined conditions can be limited and anti-crime measures can be taken.

When the position switch 70a detects the lever 20 at the gripping position, the CPU 80 stops the movement of the lever 20 by the driving device 40, so excessive loads on the driving device 40 can be suppressed and damage to the position change unit can be avoided.

Next, modifications obtained by partially changing the embodiment described above will be described.

1. Although an example in which the latch switch 14a can detect three states including the full-latch state, the half-latch state, and the unlatch state has been described in the embodiment described above, the latch switch 14a may detect the full-latch state and the other states or two states including the full-latch state and the unlatch state. This can detect at least the half-shut state of the side door 8.

2. Although an example in which the position at which the engagement between the striker and the latch can be released is the same as the gripping position has been described in the embodiment described above, the position at which the engagement between the striker and the latch can be released may be set to an outer side (in the open direction) in the vehicle width direction of the gripping position. This can widen the control variations.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the invention is indicated by the appended claims, rather than the foregoing description.

The invention claimed is:

1. A door system, comprising:
a handle lever capable of projecting to an outer side in a vehicle width direction from a storage position at which the handle lever is flush with a surface of a door panel, wherein the handle lever includes a position switch that detects that the handle lever is located at a gripping position, wherein the handle lever is in communication with a request switch operated by an occupant to open a closed door panel, the request switch being provided on the door panel;

a latch mechanism that includes a latch engageable with a striker provided in a vehicle body in conjunction with the handle lever; and a latch switch that detects whether the latch is in a full-latch state;

a motor; and processing circuitry configured to control driving of the motor based on input signals from the latch switch, the request switch, and the position switch, detect a movement position of the handle lever, detect whether the latch is in a full-latch state, change, by the motor, the position of the handle lever to a gripping position at which the handle lever is grippable by causing the handle lever to project from a surface of the door panel in response to the latch not being in the full-latch state and the handle lever being at the storage position, stop, by the motor, the position change of the handle lever when the position switch detects the handle lever at the gripping position after the handle lever starts moving in an open direction, change, by the motor, the position of the handle lever from the gripping position to the storage position a predetermined time after the position of the handle lever is changed to the gripping position, when a side door having been closed is opened, the processing circuitry is further configured to determine whether the request switch has been turned on by a pressing operation, in a case that the request switch has been turned on, determine whether the handle lever is at the storage position, and in a case that the lever is at the storage position, feed current to the motor for forward rotation to change the position of the handle lever to the gripping position, when the side door is in a half-shut state and in response to the request switch having not been turned on, the processing circuitry is further configured to determine whether the latch is in the full latch state, determine whether the handle lever is at the storage position, and in a case that the lever is at the storage position, feed current to the motor for forward rotation to change the position of the handle lever to the gripping position, wherein the latch switch, the request switch, and the position switch are connected to the input side of the processing circuitry and the motor is connected to an output side of the processing circuitry.

2. The door handle according to claim 1, wherein the processing circuitry is further configured to change the position of the handle lever to the gripping position based on an operation of the request switch when the latch is in the full-latch state and the handle lever is at the storage position.

3. A vehicle, comprising:

a vehicle body including a door panel;

a handle lever capable of projecting to an outer side in a vehicle width direction from a storage position at which the handle lever is flush with a surface of the door panel, wherein the handle lever includes a position switch that detects that the handle lever is located at a gripping position, wherein the handle lever is in communication with a request switch operated by an occupant to open a closed door panel, the request switch being provided on the door panel;

a latch mechanism that includes a latch engageable with a striker provided in the vehicle body in conjunction with the handle lever; and a latch switch that detects whether the latch is in a full-latch state;

a motor; and processing circuitry configured to control driving of the motor based on input signals from the latch switch, the request switch, and the position switch, detect a movement position of the handle lever, detect whether the latch is in a full-latch state, change, by the motor, the position of the handle lever to a gripping position at which the handle lever is grippable by causing the handle lever to project from a surface of the door panel in response to the latch not being in the full-latch state and the handle lever being at the storage position, stop, by the motor, the position change of the handle lever when the position switch detects the handle lever at the gripping position after the handle lever starts moving in an open direction, change, by the motor, the position of the handle lever from the gripping position to the storage position a predetermined time after the position of the handle lever is changed to the gripping position, when a side door having been closed is opened, the processing circuitry is further configured to determine whether the request switch has been turned on by a pressing operation, in a case that the request switch has been turned on, determine whether the handle lever is at the storage position, and in a case that the lever is at the storage position, feed current to the motor for forward rotation to change the position of the handle lever to the gripping position, when the side door is in a half-shut state and in response to the request switch having not been turned on, the processing circuitry is further configured to determine whether the latch is in the full latch state, determine whether the handle lever is at the storage position, and in a case that the lever is at the storage position, feed current to the motor for forward rotation to change the position of the handle lever to the gripping position, wherein the latch switch, the request switch, and the position switch are connected to the input side of the processing circuitry and the motor is connected to an output side of the processing circuitry.

4. The vehicle according to claim 3, further comprising:

wherein the processing circuitry is further configured to change the position of the handle lever to the gripping position based on an operation of the request switch in response to the latch being in the full-latch state and the handle lever being at the storage position.

\* \* \* \* \*